3,420,678
TASTE OF SEASONING, FOOD AND DRINKS
Akio Shiga, Machida-shi, Japan, assignor to Kyowa Hakko Kogyo Co., Ltd., Tokyo, Japan, a corporation of Japan
No Drawing. Filed July 19, 1966, Ser. No. 566,226
Claims priority, application Japan, July 23, 1965, 40/44,168
U.S. Cl. 99—140                9 Claims
Int. Cl. A23l 1/22

This invention relates to an improvement in the taste of seasoning, food and drinks. More particularly, it relates to improving the taste of seasoning, food and drinks which contain 5'-nucleotides. Even more particularly, the invention relates to an improvement in the taste of seasoning, food and drinks which contain 5'-nucleotides by the use of L-glutamine or L-glutamine containing compounds.

L-glutamine by itself does not provide food and drinks with a delicious taste. However, as a result of various studies by the present inventor, it has been found in accordance with the present invention that L-glutamine co-operates strongly with 5'-nucleotides to give a delicious taste having a high quality and strength even in the absence of sodium L-glutamate.

Accordingly, it is the principal object of the present invention to provide a composition which is useful in enhancing the taste of condiments (seasonings) and food and drinks.

L-glutamine is widely present in nature, especially in the roots of sugar beets. However, as noted above, L-glutamine alone does not provide a delicious taste. However, when L-glutamine is combined with a 5'-nucleotide, for example, sodium 5'-inosinate or a substance containing a 5'-nucleotide, a cooperative action is obtained to give a remarkably more delicious taste than in the case of the use of sodium 5'-inosinate alone.

This result is indicated in the examples which are enumerated in Table 1 below. These experiments were conducted by determining the order and difference of delicious taste through a comparisotn of total points for each sample given by tasters through a system wherein certain points were given to a sample in accordance with the following marking system:

Mark of "0"—No difference observed.
Mark of "1"—Slight difference observed.
Mark of "2"—Clear difference observed.
Mark of "3"—Fair difference observed.
Mark of "4"—Remarkable difference observed.

Ten tasters were employed, and an examiner tabulated and correlated the makings in order to indicate the degree of delicious taste of the various samples.

The percentages noted in Table 1 are by weight.

From the results given in Table 1, it can be seen that sodium 5'-inosinate alone does not provide a delicious taste, while L-glutamine alone also fails to provide a particularly delicious taste. However, the combination of these two substances together results in a remarkably strong delicious taste. It was indicated by the Examiner that the quality of the thusly obtained taste is excellent and has a remarkably natural sense.

It has been known that a delicious taste can be promoted by the cooperative effect of sodium L-glutamate and 5'-nucleotides. However, the cooperative effect or synergistic action of promoting a delicious taste by the combination of L-glutamine with 5'-nucleotides which is at least as good as that obtained by the combination of sodium L-glutamate and 5'-nucleotides has not been known heretofore.

The present invention thus provides an efficacious and simple way of promoting a delicious taste in food and drinks, which has an excellent natural quality. This is even of more significance when it is considered that recent studies have indicated the physiological value of L-glutamine, for example, its having been characterized as being capable of promoting the appetite.

In seasonings already containing L-glutamine, the amount of 5'-nucleotides to be added thereto, for example, sodium 5'-inosinate may be varied depending upon the particular objective desired. However, an amount ranging between 1:100 to 100:100 by weight of 5'-nucleotide to L-glutamine is preferred.

Condiments or seasonings having compositions in accordance with the present invention were employed in the processing of various foods and culinary methods, and very satisfactory effects were observed as a result thereof.

The following examples are given merely as illustrative of practical manufacturing embodiments of the present invention and are not to be considered as limiting.

TABLE 2

[100 gram portions of various compositions of condiments (seasonings), as indicated below, are prepared]

| Example | L-glutamine (grams) | 5'-nucleotide |
|---|---|---|
| I | 90 | 10 grams of sodium 5'-inosinate. |
| II | 50 | 50 grams of sodium 5'-guanylate. |
| III | 10 | (a) 5 grams of sodium 5'-guanylate. (b) 85 grams of sodium L-glutamate. |
| IV | 19.5 | (a) 80 grams of edible salt (NaCl). (b) 0.5 gram of sodium 5-'adenosine triphosphate. |
| V | 15 | (a) 50 grams of edible salt (NaCl). (b) 30 grams of sodium L-glutamate. (c) 5 grams of sodium 5'-adenylate. |

Seasonings prepared in accordance with the examples shown in Table 2 provide remarkably improved tastes, compared with those consisting essentially of sodium glutamate. Notably favorable effects are observed when such seasonings are added to food and drinks generally.

TABLE 1

| Sample No. | Composition of samples | A | B | C | D | E | F | G | H | I | J | Total of marks |
|---|---|---|---|---|---|---|---|---|---|---|---|---|
| 1 | Water | 0 | 0 | 0 | 0 | 0 | 0 | 0 | 0 | 0 | 0 | 0 |
|   | Sodium 5'-inosinate 0.05% | 0 | 0 | 0 | 0 | 0 | 0 | 1 | 1 | 0 | 0 | 3 |
| 2 | Water | 0 | 0 | 0 | 0 | 0 | 0 | 0 | 0 | 0 | 0 | 0 |
|   | Sodium 5'-inosinate 0.1% | 0 | 1 | 0 | 0 | 0 | 0 | 1 | 0 | 0 | 0 | 2 |
| 3 | Water | 0 | 0 | 0 | 0 | 0 | 0 | 0 | 0 | 0 | 0 | 0 |
|   | Sodium 5'-inosinate 0.2% | 1 | 0 | 0 | 1 | 1 | 1 | 0 | 0 | 0 | 0 | 4 |
| 4 | Water | 0 | 0 | 0 | 0 | 0 | 0 | 0 | 0 | 0 | 0 | 0 |
|   | L-glutamine 0.1% | 0 | 1 | 1 | 0 | 0 | 1 | 0 | 0 | 0 | 0 | 3 |
| 5 | Water | 0 | 0 | 0 | 0 | 0 | 0 | 0 | 0 | 0 | 0 | 0 |
|   | L-glutamine 0.2% | 1 | 0 | 0 | 1 | 1 | 1 | 0 | 0 | 0 | 0 | 4 |
| 6 | Water | 0 | 0 | 0 | 0 | 0 | 0 | 0 | 0 | 90 | 0 | 0 |
|   | L-glutamine 0.1%+sodium 5'-inosinate 0.05% | 3 | 4 | 2 | 3 | 3 | 2 | 4 | 4 | 3 | 3 | 31 |
| 7 | Water | 0 | 0 | 0 | 0 | 0 | 0 | 0 | 0 | 0 | 0 | 0 |
|   | L-glutamine 0.5%+sodium 5'-inosinate 0.05% | 4 | 4 | 4 | 4 | 4 | 2 | 4 | 4 | 4 | 4 | 38 |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A composition useful for enhancing the taste of food and drinks comprising L-glutamine and a 5'-nucleotide.

2. The composition of claim 1, wherein the proportion of L-glutamine to 5'-nucleotide ranges from 100:1 to 100:100 by weight.

3. The composition of claim 1, wherein said 5'-nucleotide is selected from the group consisting of sodium 5'-inosinate, sodium 5'-guanylate, sodium 5'-adenylate and sodium 5'-adenosine triphosphate.

4. A foodstuff containing from 0.01 to 1.0% by weight of a composition comprising L-glutamine and 5'-nucleotide.

5. The foodstuff of claim 4, wherein said 5'-nucleotide is selected from the group consisting of sodium 5'-inosinate, sodium 5'-guanylate, sodium 5'-adenylate and sodium 5'-adenosine triphosphate.

6. A process for improving and enhancing the taste of foods, drinks and condiments which comprises incorporating therein a composition comprising L-glutamine and a 5'-nucleotide.

7. The process of claim 6, wherein the proportion of L-glutamine to 5'-nucleotide ranges from 100:1 to 100:100 by weight.

8. The process of claim 7, wherein from 0.01 to 1.0% by weight of said composition is employed.

9. The process of claim 8, wherein said 5'-nucleotide is selected from the group consisting of sodium 5'-inosinate, sodium 5'-guanylate, sodium 5'-adenylate and sodium 5'-adenylate and sodium 5'-adenosine triphosphate.

References Cited

UNITED STATES PATENTS 3,104,171    9/1963    Sakaguchi et al. _____ 99—140

ALVIN E. TANENHOLTZ, Primary Examiner.

U.S. Cl. X.R.

99—143